Oct. 7, 1952  G. R. HUBBARD  2,612,778
LIQUID FUEL MEASURING AND DELIVERY DEVICE
Filed May 29, 1947  2 SHEETS—SHEET 1

Inventor
Guy R. Hubbard

By Clarence A. O'Brien
and Harvey B. Jacobson
Attorneys

Oct. 7, 1952     G. R. HUBBARD     2,612,778
LIQUID FUEL MEASURING AND DELIVERY DEVICE
Filed May 29, 1947     2 SHEETS—SHEET 2
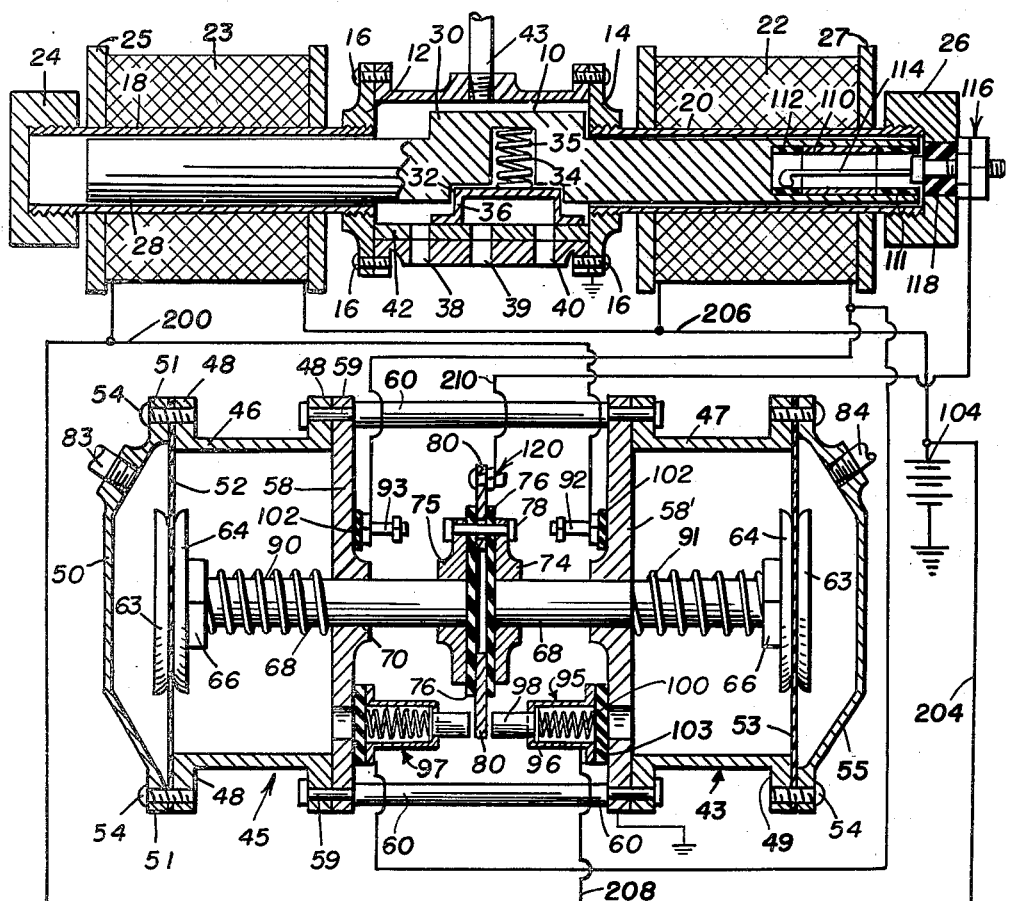
Fig. 4.
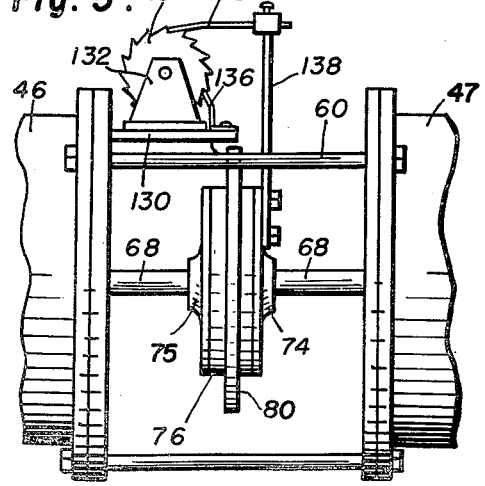
Fig. 5.
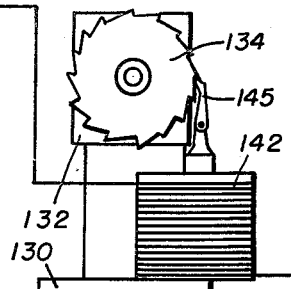
Inventor
Guy R. Hubbard
By Clarence A. O'Brien
and Harvey B. Jacobson
Attorneys Patented Oct. 7, 1952

2,612,778

UNITED STATES PATENT OFFICE 2,612,778

LIQUID FUEL MEASURING AND DELIVERY DEVICE

Guy R. Hubbard, Groton, Conn.

Application May 29, 1947, Serial No. 751,487

3 Claims. (Cl. 73—268)

1

This invention relates to novel and useful improvements in devices particularly useful in measuring and injecting a predetermined quantity of fuel into the carburetor of an internal combustion engine.

An object of this invention is to provide means for receiving fluid, retaining the same, thence ejecting a predetermined, measured quantity into a conventional carburetor or the like.

Another object of this invention is to provide solenoid actuated control means for directing a quantity of fluid into a selected expansible fluid receiving chamber.

A further object of this invention is to provide means associated with said expansible chamber means for energizing the above mentioned solenoid means.

A still further object of this invention is to provide a plurality of counter means, associated not only with the solenoid means but also with the expansible chamber means, for indicating the quantity of fluid conducted through the system.

Another object of this invention is to provide an extremely simple, efficient device for determining the quantity of fuel utilized in the operation of certain types of engines.

Other objects and features of novelty shall become apparent to those skilled in the art, in following the description of the preferred embodiment of the present invention, illustrated in the accompanying drawings, wherein:

Figure 4 is a sectional view of the invention disclosed in Figure 2 and taken substantially on the line 4—4 thereof and in the direction of the arrows, wiring and counter means being added thereto, and;

Figure 5 is a fragmentary elevational view of the counter utilized in conjunction with the present invention and forming a part thereof.

Figure 1:
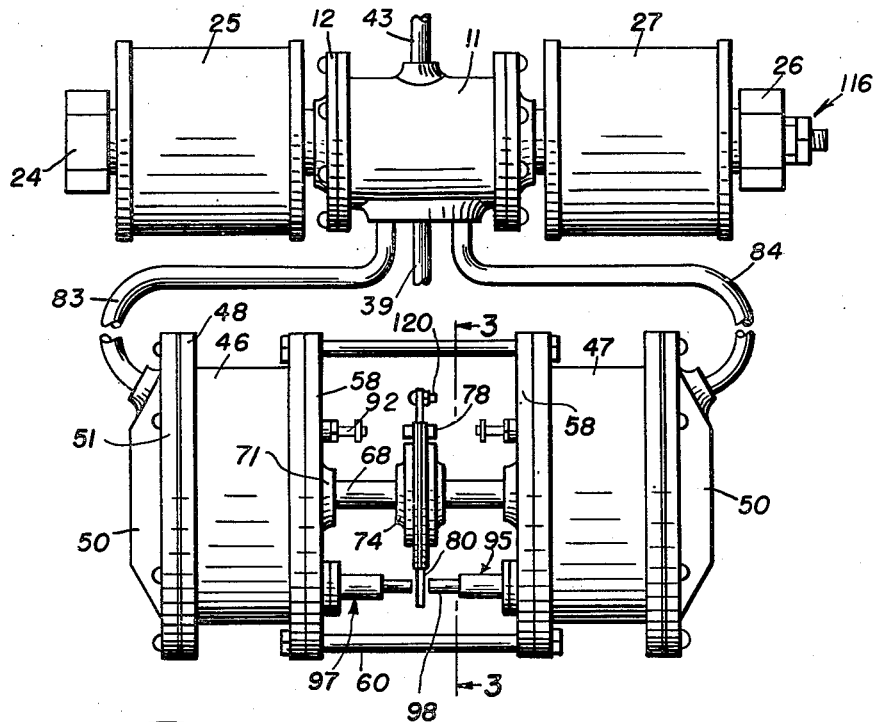
Figure 1 is an elevational view of the preferred form of the present invention, a portion thereof removed for clarity.
Figure 2:
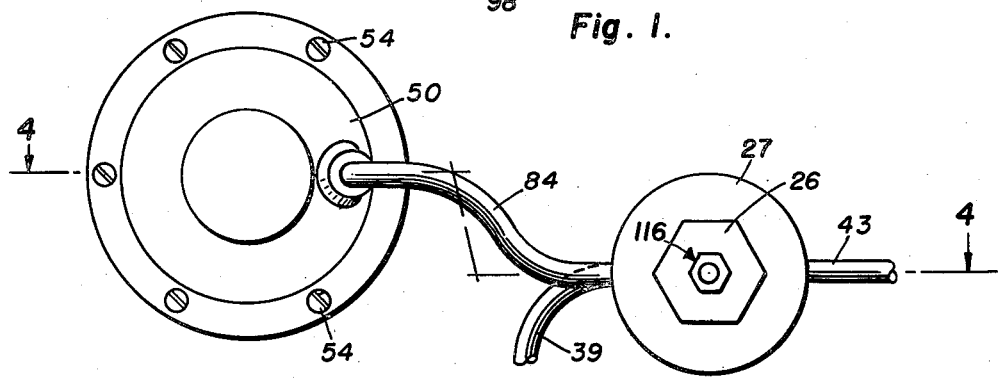
Figure 2 is a plan view of the invention disclosed in Figure 1.
Figure 3:
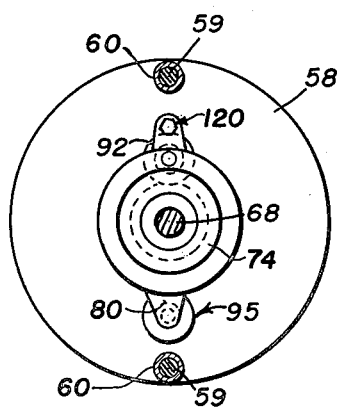
Figure 3 is a sectional detail of construction taken substantially on the line 3—3 of Figure 1 and in the direction of the arrows.

This invention has been conceived and developed to provide a device for measuring and recording the liquid fuel as delivered by pump or by gravity where sufficient head is available. The general principle of operation depends upon the action of the diaphragms in displacing controlled and uniformed quantities of fluid by controlling the extent of diaphragm deflection. A pair of

2 counters are utilized in conjunction with the present invention, each of which is actuated in accordance with the movement of the said diaphragms.

The present invention consists primarily of three salient elements which are, valve means with a portion of the valve actuation mechanism, expansible chamber means also with a portion of the said valve actuation means and a pair of counters which are actuated by the above described elements.

Taking first the valve means, a valve chamber 10 is composed of a housing 11 having detachable end plates 12 and 14 secured thereto. Any conventional securing means may be utilized in making the junction of these members, preferably the invention employs the inexpensive and acceptable screws 16. Sleeves 18 and 20 respectively are secured to the said detachable end plates 14 and 16. Positioned about said sleeves is a field coil 22 and a coil 23 on said sleeves respectively. Internally threaded caps 24 and 26 respectively are threadedly disposed on the ends of the said sleeves 18 and 20 and a core or armature 28 is slidably received in the sleeves and the said valve chamber 10 thus forming solenoids 25 and 27 having a common core. This core has an enlargement 30 at substantially the center thereof and a recess 32 opposite said enlargement. A bore 34 communicates with the said recess 32 and a spring is seated therein. A cage 36 is disposed in said recess 32 and serves in the capacity of a valve.

There are provided three ports 38, 39, and 40 in the lower portion of the said valve chamber housing 11. A base or wear plate 42 is positioned within said lower portion of the valve chamber housing and has ports therein complemental to the above mentioned ports 38, 39 and 40. It is upon this base plate 42 that the said cage valve 36 is located. The spring 35 disposed in the bore 34 urges the said cage 36 gently against the base plate 42. The armature 28 is slidably received in the said valve chamber and as it moves, it carries the said cage 36 therewith. As the said cage moves in a reciprocatory manner, selected ports are placed in communication with each other. In the position as in Figure 4, the ports 39 and 40 directly communicates with the cage valve 36 which partitions the other port 38 from fluid communication therewith.

A fourth port with a conduit 43 therein communicates with the upper portion of the said valve chamber 10 through the housing 11 and it is through this last mentioned port that fluid, usually fuel, is urged.

A housing, generally indicated by the reference numeral 45 is provided as the recipient for the means for expansibly receiving and discharging fuel. This is the second element of the device as broadly broken down for descriptive purposes. The said housing 45 is composed of a plurality of elements which are joined together by usual conventional means. A substantially symmetrical housing is disclosed and accordingly, a description of half of the same will necessarily lead to an understanding of the other half. An annular collar 46 is provided with flanges 48 at the ends thereof and a cap 50 having mating flanges 51 at the end thereof, is applied to the collar 46. In the counterpart, the housing 43 consists of the collar 47 with the flange 49 and the cap 55 assembled as the housing 45. A diaphragm 52 is interposed between the said flanges 48 and 51 and the device is held together by suitable conventional bolts or screws 54; and a diaphragm 53 is found in the counterpart of the structure. The diaphragm 52 and the cap 50 form a fuel chamber while the diaphragm 53 and the cap 55 form another fuel chamber. A back plate 58 is secured to the opposite end of the said collar 46 and is retained rigidly thereto by means of stay rods 59. These stay rods extend through sleeves 60 then retain the collar 47, back plate 58' and cap 55 in a predetermined spaced relation relative to the above described related elements.

The said diaphragms 52 and 53 are provided with the usual retention collars 63 and 64, which are held in the desired fixed position by means of conventional nuts 66. The said nuts 66 are disposed on a shaft 68 which is journaled in apertures 70, provided in the back plates 58 and 58'. A cap or boss 74 is secured to the end of the said shaft 68 and a second boss 75 is provided on the end of the complemental part of the shaft 68. Interposed between the two bosses 74 and 75 is a pair of insulating plates or discs 76. A pin which forms a contact 78 is secured to the said bosses 74 for the purpose of retaining the same in fixed relation. An extension which is preferably in the form of a disk 80 is interposed between the said insulating plates 76 and form a substantial continuation thereof, but the disk is of electrically conductive material.

A conduit 83 extends from the port 38 to a suitable inlet in the cap 50. As described above, the diaphragm 52 defines a chamber within the said cap 50. A second conduit 84 extends from the other cap 55 to the port 40. Fuel taken in through the conduit 43 is forced through the port 38, thence into the expansible chamber behind the inlet conduit 83. This action forces the diaphragm 52 in an obvious direction thereby urging the shaft 68 against the action of the spring 90. This spring 90 and the spring 91 are provided for the purpose of retaining the diaphragms in the proper, undistorted position. As the shaft 68 is urged in one direction, contact is made between the adjustable posts member 92 and the contact 78. Also, the lower extension 80 engages and urges a spring loaded telescopic contact 95. This telescopic contact is a simple sleeve 96 having a plunger 98 slidably received in the bore thereof, which is biased by means of a spring 100. The said contacts 95 and 92 are mounted on insulating blocks 102 and 103 respectively which are fixed to the plate 58'. There is an electrical source of current, indicated as a vehicle battery 104. The solenoids 25 and 27 together with the various contacts are in the circuit associated herewith. The said contacts 95 and 92 are used to complete the circuit between the battery 104 and the solenoid 25. After a predetermined amount of liquid is received in either one of the said chambers defined by the caps 50 and 55 and diaphragms 52 and 53, the valve cage is moved thereby restricting the travel of more fluid into one of the chambers. When the said port 38 is closed to the admission of more fuel to the expansible chamber formed partly by the diaphragm 52, the cage 36 is positioned thereover and the fuel is exhausted through the outlet port 39 to the carburetor or directly to the cylinders of an engine. It is the reversed action of the diaphragm (the expansion in the opposite direction) which forces the fuel back into the valve chamber 10 thence into the carburetor of an engine.

In order to eliminate dead centers in the travel of the armature 28, a special switch is provided therein. A brass bushing 110 is provided in a suitable bore within the said armature and a fibre insulating member 112 is disposed at one end thereof and forms a continuation of said bushing. A second insulating bushing 111 is disposed at the opposite end of said brass bushing 110. A resilient contact arm 114 is engageable at one end with the said fibre bushings and brass bushing selectively. The other end of the said resilient contact is received in a suitable clamping assembly 116 which is insulated by means of a sleeve 118 from the cap 26. A wire is led from the said clamping means 116 to the upper portion of the disk 80, wherein it is attached by means of a bolt and nut construction 120. The positioning of the fibre sleeve bushing 112 is such that when the resilient contact 114 is resting thereon, the cage valve 36 is not at a dead center. If the armature should attempt to stop reciprocation in any position but the position of fibre sleeve and resilient contact arm in engagement, it is apparent that the resilient contact arm 114 would engage the sleeve 110 and the circuit would be complete, the armature moving slightly to the position of non-dead center.

The conduit 43 has one end connected with the outlet side of a vehicle fuel pump whereby fuel under pressure is introduced within the valve chamber 10. The fuel is then conducted through the port 38 and conduit 83 to enter the chamber closed by the diaphragm 52 thereby flexing the diaphragm 52 and urging the shaft 68 axially. The axial movement of the shaft 68 flexes the diaphragm 53 in the direction opposite the flexure of the diaphragm 52. Hence, the chamber partly closed by the diaphragm 53, being filled with fuel has its volume decreased thereby urging its fuel through the conduit 84 and port 40 and within the confines of the cage 36. Since the cage 36 is in constant communication with the port 39, the fuel flowing through the cage 36 is discharged through the port 39 which has a line secured thereto and to the inlet of an engine carburetor or injection device.

When the shaft 68 has moved an appreciable amount due to the fuel pressure on the diaphragm 52, the contact 78 on ring 80 engages the contact 92 having the wire 200 connected therewith which terminates in electrical communication with the counter solenoid 142 and which is connected with the solenoid coil 23 thereby grounding the circuit of the solenoid 25 and causing it to operate and also grounding the counter solenoid causing it to operate. The hot wire 204 extends from the battery 104 to the hot side of the counter solenoid. In order to complete the circuit with the coil 23 the line 206 which is secured with the battery is used.

Before the contacts 92 and 78 engage in this cycle of operation, a part of the disk 80 engages the contact plunger 98 and presses it against the spring 100. Wire 208 terminates at one end in contact with the plunger sleeve 96 and at the opposite end in connection with the wire 200. The wire 210 is secured to the disk 80 and the assembly 116 so that the arm 114 becomes energized through the wires 208 and 210 respectively.

Hence, as soon as the contacts 78 and 92 engage, the solenoid 25 is operated to regulate the ports 38 and 40. But if the core 28 stops in a position so that the cage 36 is not properly disposed with respect to the parts 38 and 40, the arm 114 completes the circuit of the solenoid coil 23 through the wires 200, 208, the disk 80 and the wire 210. The operation of the arm 114 in connection with the insulating bushings 111 and 112 and the conducting bushing 110 has been set forth previously.

After the core 28 has been moved by energization of the solenoid coil 23, the cage 36 will be in such position as to communicate the ports 38 and 39 with each other thereby permitting fluid to flow through the conduit 84 which is attached in the port 40 and into the diaphragm 53 chamber. This urges the shaft 68 in the opposite direction and sets the system in operation utilizing the coil 22, contacts 93 and 97 and appropriate wiring similar to the previously described wiring to energize the counter coil 142.

Accordingly when the fuel chambers, partially closed by the diaphragms, are filled, the electrically operative counter is actuated to indicate the number of times the chambers are filled. The volume of the chambers being easily found, the counter can be set to indicate the amount of fuel used.

A mechanical counter composed of a base 130 having brackets 132 extending therefrom and other associated mechanism, is secured to a suitable position, preferably one or more of the sleeves 60. A geared wheel 134 is suitably journaled between the said brackets 132 and a dog 136 is engageable therewith. This dog merely prevents undesirable rotation of the wheel. A rod 138 is secured to a boss 74 and an adjustable extension 140 extends substantially perpendicular therefrom. This extension engages the teeth on the geared wheel and for each reciprocation of the said shaft 68 a single increment will be measured by rotation of the said wheel 134.

A similar construction is provided as a second counter for utility in the above mentioned electrical circuit. This, however, is solenoid operated, there being provided a solenoid 142 having a counter arm 145 rigidly secured to the armature thereof. Obviously upon reciprocation of the said shaft 68 there will be two countings, one mechanical and the other electrically actuated.

Having described the invention, what is claimed as new is:

1. In a fuel flow indicator, a housing, means forming a first and a second expansible chamber in said housing, a shaft connecting a part of said means forming each chamber so that expansion of one of the expansible chambers is reflected in contraction of the other chamber, a first and a second solenoid which includes a single core, a valve chamber member disposed around a part of said core, a fuel inlet element communicating with said valve chamber member, a fuel discharge member and ports in said valve chamber member, a conduit communicating said first chamber with one of the ports in said valve chamber member and a conduit communicating said second chamber with another of said ports in said valve chamber member, a valve disposed in said valve chamber member and fixed for movement with said core, said valve being so arranged with respect to said ports and said discharge member that one of said ports communicates with the discharge member for fuel flow and upon movement of said core the other of the ports communicates with the discharge member, a switch carried by said housing and said shaft, and means operatively connected with said core and energized through said switch to prevent said core from coming to such a rest position that the valve does not communicate one of the ports with said discharge member.

2. The combination of claim 1 and an arm carried by said shaft, a counter secured to said housing, and means secured to said arm and engaging a part of said counter for operating said counter each time the shaft is reciprocated.

3. The combination of claim 1 and a spring reacting on said valve and said core constantly pressing said valve toward the portion of said valve chamber member having said ports therein.

GUY R. HUBBARD.

REFERENCES CITED

The following references are of record in the file of this patent:

UNITED STATES PATENTS

| Number | Name | Date |
|---|---|---|
| 20,169 | Perrine | May 4, 1858 |
| 512,135 | Wallace | Jan. 2, 1894 |
| 1,306,966 | Marcoux et al. | June 17, 1919 |
| 2,014,664 | Nicholls | Sept. 17, 1935 |
| 2,123,577 | Pelich | July 12, 1937 |
| 2,463,806 | Price | Mar. 8, 1949 |

FOREIGN PATENTS

| Number | Country | Date |
|---|---|---|
| 71,248 | Switzerland | Dec. 16, 1915 |
| 412,368 | Great Britain | June 28, 1934 |